US009021071B2

(12) United States Patent
Setnes et al.

(10) Patent No.: US 9,021,071 B2
(45) Date of Patent: Apr. 28, 2015

(54) METHODS OF FEDERATING APPLICATIONS PROVIDING MODULAR DATA (75) Inventors: Marie Louise Setnes, Minneapolis, MN (US); John Sebastian Warren, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1648 days.

(21) Appl. No.: 12/135,946

(22) Filed: Jun. 9, 2008

(65) Prior Publication Data

US 2009/0307339 A1 Dec. 10, 2009

(51) Int. Cl.
*G06F 15/177* (2006.01)
*G06F 9/50* (2006.01)
*G06F 15/16* (2006.01)

(52) U.S. Cl.
CPC ............ *G06F 9/5061* (2013.01); *G06F 9/5033* (2013.01)

(58) Field of Classification Search
CPC ..... H04L 41/044; H04L 41/12; H04L 41/042; H04L 41/024; H04L 41/0806; H04L 45/04; G06F 9/5066; G06F 9/5061; G06F 9/5033
USPC .................. 709/201, 208, 217–219, 220–223
See application file for complete search history.

(56) References Cited

U.S. PATENT DOCUMENTS

| 6,799,202 | B1 * | 9/2004 | Hankinson et al. ........... 709/219 |
| 6,915,212 | B2 | 7/2005 | Kamps ............... 702/14 |
| 8,095,670 | B2 * | 1/2012 | Brown et al. .................. 709/229 |
| 2004/0107277 | A1 * | 6/2004 | Levesque et al. ............. 709/223 |
| 2005/0114291 | A1 * | 5/2005 | Becker-Szendy et al. ........ 707/1 |
| 2005/0198238 | A1 * | 9/2005 | Sim et al. ....................... 709/222 |
| 2005/0198244 | A1 * | 9/2005 | Eilam et al. ................... 709/223 |
| 2006/0080417 | A1 | 4/2006 | Boutboul et al. ............. 709/220 |
| 2006/0089973 | A1 | 4/2006 | Kramer ......................... 709/208 |
| 2006/0159014 | A1 * | 7/2006 | Breiter et al. ................. 370/229 |
| 2008/0288659 | A1 * | 11/2008 | Hasha et al. .................. 709/250 |
| 2009/0063579 | A1 * | 3/2009 | Chan et al. .................... 707/202 |

* cited by examiner

*Primary Examiner* — Alina N Boutah
(74) *Attorney, Agent, or Firm* — Zilka-Kotab, PC (57) ABSTRACT A method in one embodiment includes establishing communication between a master node and several federated nodes, wherein each node is an instance of a distributed application; initializing the distributed application, wherein the initialization includes the federated nodes processing data local thereto and providing information about the local data to the master node; and after initialization, at run time, receiving data requests, wherein the master node services the data requests by routing the requests to the nodes. A method in another embodiment includes establishing communication between a master node and several federated nodes, wherein each node is an instance of a distributed application; initializing the distributed application, including gathering information about local data associated with each of the federated nodes, the information including associations of local data across multiple federated nodes; and after initialization, at run time, receiving data requests, wherein the master node services the data requests by routing the requests to one of the nodes believed to have the requested data.

20 Claims, 5 Drawing Sheets

METHODS OF FEDERATING APPLICATIONS PROVIDING MODULAR DATA

BACKGROUND

The present invention relates to distributed computing, and more particularly, this invention relates to addressing scalability of applications that, for performance reasons, require that the set of resources being queried be stored in memory.

Current distributed computing models generally involve either tightly-coupled nodes (i.e., clustered computing), distribution of workload based on service type, (i.e., SOA or 3/N-tier architectures), or virtualized services (e.g., cloud computing). These models are focused on services rather than the resources provided by those services and do not address either the issue of scalability of data provided by a given service or instances where discrete sets of data are used as resources for a set of services.

Several solutions exist that address some of these issues, for instance virtualization of databases through the combination of several underlying RDBMS resources; however, these solutions either combine data that is distributed by type (e.g., one table is sourced from one database while another table is sourced from another database) which does not address the concern of scalability of data of the same type, or they gather resources by querying multiple data repositories to locate the required information, which is inefficient because several nodes must be queried before the data is located. Finally, current distributed computing models do not address data aggregation concerns where aggregated data involving relationships between resources in the aggregated sets is preprocessed as part of the overall application's initialization procedure, thereby improving runtime performance. This is particularly relevant with data such as RDF, where information about a resource can be located in a number of locations.

Therefore, it would be favorable to have a mechanism for distributing workload by data set instead of service which overcomes the issues associated with the current methods.

SUMMARY

A method in one embodiment includes establishing communication between a master node and several federated nodes, wherein each node is an instance of a distributed application; initializing the distributed application, wherein the initialization includes the federated nodes processing data local thereto and providing information about the local data to the master node; and after initialization, at run time, receiving data requests, wherein the master node services the data requests by routing the requests to the nodes.

A method in another embodiment includes establishing communication between a master node and several federated nodes, wherein each node is an instance of a distributed application; initializing the distributed application, including gathering information about local data associated with each of the federated nodes, the information including associations of local data across multiple federated nodes; and after initialization, at run time, receiving data requests, wherein the master node services the data requests by routing the requests to one of the nodes believed to have the requested data. Any of these embodiments may be implemented in a computer system, which may include one or more computers, computer networks, user interfaces, etc.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method comprises establishing communication between a master node and several federated nodes, wherein each node is an instance of a distributed application; initializing the distributed application, wherein the initialization includes the federated nodes processing data local thereto and providing information about the local data to the master node; and after initialization, at run time, receiving data requests, wherein the master node services the data requests by routing the requests to the nodes.

In another general embodiment, a method comprises establishing communication between a master node and several federated nodes, wherein each node is an instance of a distributed application; initializing the distributed application, including gathering information about local data associated with each of the federated nodes, the information including associations of local data across multiple federated nodes; and after initialization, at run time, receiving data requests, wherein the master node services the data requests by routing the requests to one of the nodes believed to have the requested data.

Figure 1:
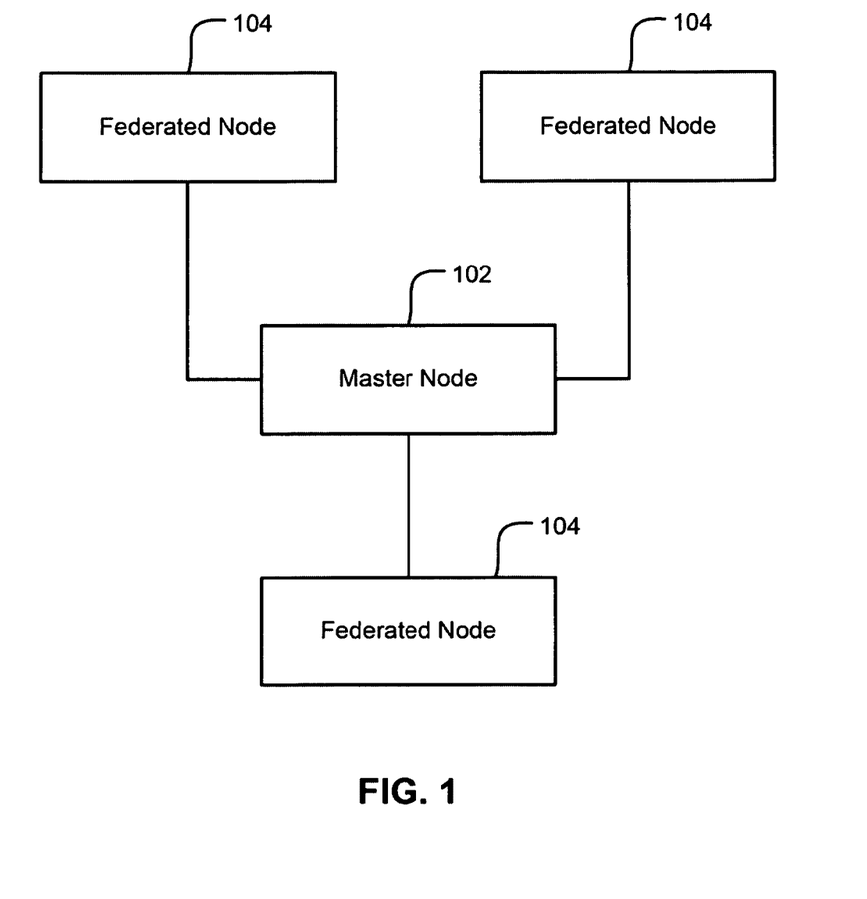
FIG. 1 is a schematic diagram of a relationship between a Master Node and Federated Nodes according to one embodiment.

In one embodiment, a master node controls a set of federated nodes. The relationship between master node and federated node can be established either by the federated node being configured to be associated with a master node or the master node can be configured to be associated with a set of federated nodes. This relationship is shown in FIG. 1, which is a schematic diagram of a Master Node 102 that is connected with a set of Federated Nodes 104.

Data in this type of distributed application is of two types: global and local. Global data is stored by the Master Node 102, while local data is stored by the Federated Nodes 104. All resources stored on the Federated Nodes 104 are tagged with a unique set identifier and each federated instance "owns" specific sets of data. Any data not belonging to a set is designated as global and is thus stored on the Master Node 102. The organization of the data can be accomplished manually, by storing data associated with a set of sets on each node or automatically, by designating which sets of data are to be stored on which node and distributing the data accordingly through some type of automated process. Scalability is achieved by allowing sets of data to be moved from one node to another; a data set is atomic, thus if it becomes too large to be stored on a single node, it will need to be manually split into multiple sets. The Master Node 102 may also have data sets assigned to it and some specific data types may be associated with the Master Node 102 as well. The node where a resource is stored will hereinafter be referred to as the resource's "home node."

Figure 2:
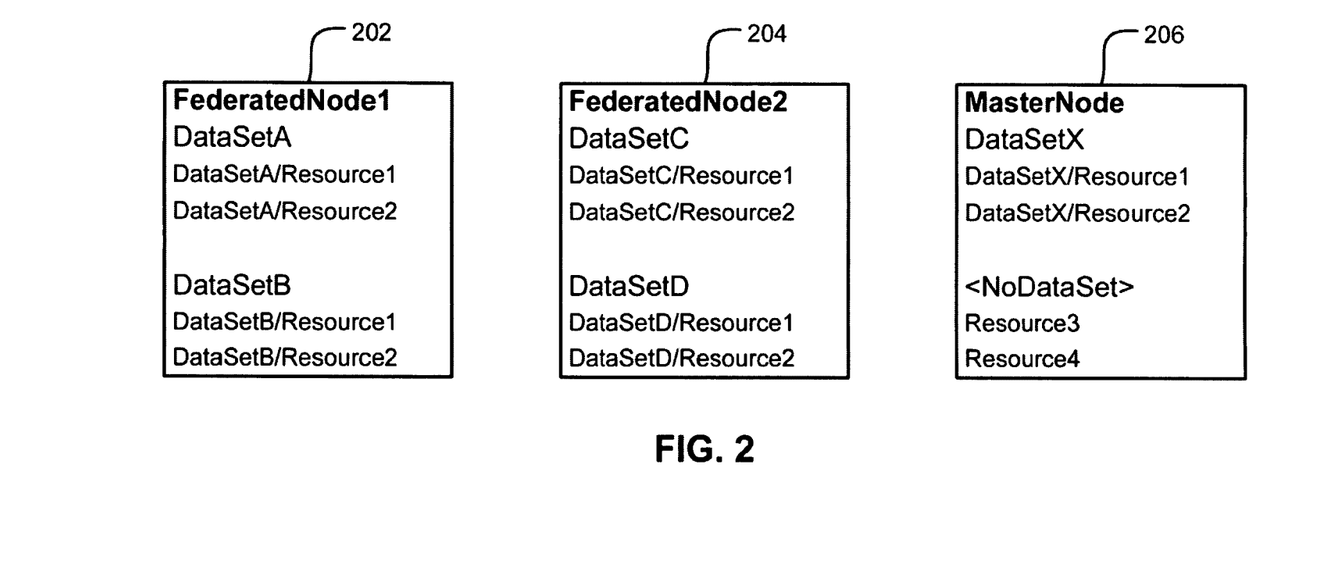
FIG. 2 is a schematic diagram showing information which might be stored in each node according to one embodiment.

In FIG. 2, one example of what type of data may exist under each node is shown. FederatedNode1 202 includes DataSetA and DataSetB, which each contain Resource1 and Resource2. Similarly, FederatedNode2 204 includes DataSetC and DataSetD, which each contain Resource1 and Resource2. MasterNode 206 includes DataSetX, which includes Resource1 and Resource2, and also includes Resource3 and Resource4 data.

In one embodiment, once either the master or the federated instances are configured to form a federation, communication is established to determine which nodes are available and what content sets they provide. Communication is maintained at regularly timed intervals between the Master Node 102 and Federated Nodes 104 while the application is running. Once all Federated Nodes 104 have been started, their compatibility is established and they are available for use (this could be determined manually or automatically), and the application initializes.

The Master Node 102 orchestrates the initialization of the virtual application. In one embodiment, the initialization has the following characteristics:
1. Data is shared between nodes
2. Calculations performed on a node may be stored locally or "pushed" to another node or nodes
3. Data interchanges between nodes are tracked with regard to the source node of the data
4. All results to relevant calculations performed during initialization are serialized so they can be retrieved when nodes are restarted without any changes to the data they contain
5. Initialization can be organized into phases, each of which must be completed in unison The nature of the initialization process is described below with the aid of FIG. 3, which shows a distributed set of data that is arranged into hierarchies (for instance a navigation structure or taxonomy) through references between resources according to one embodiment.

Figure 3:
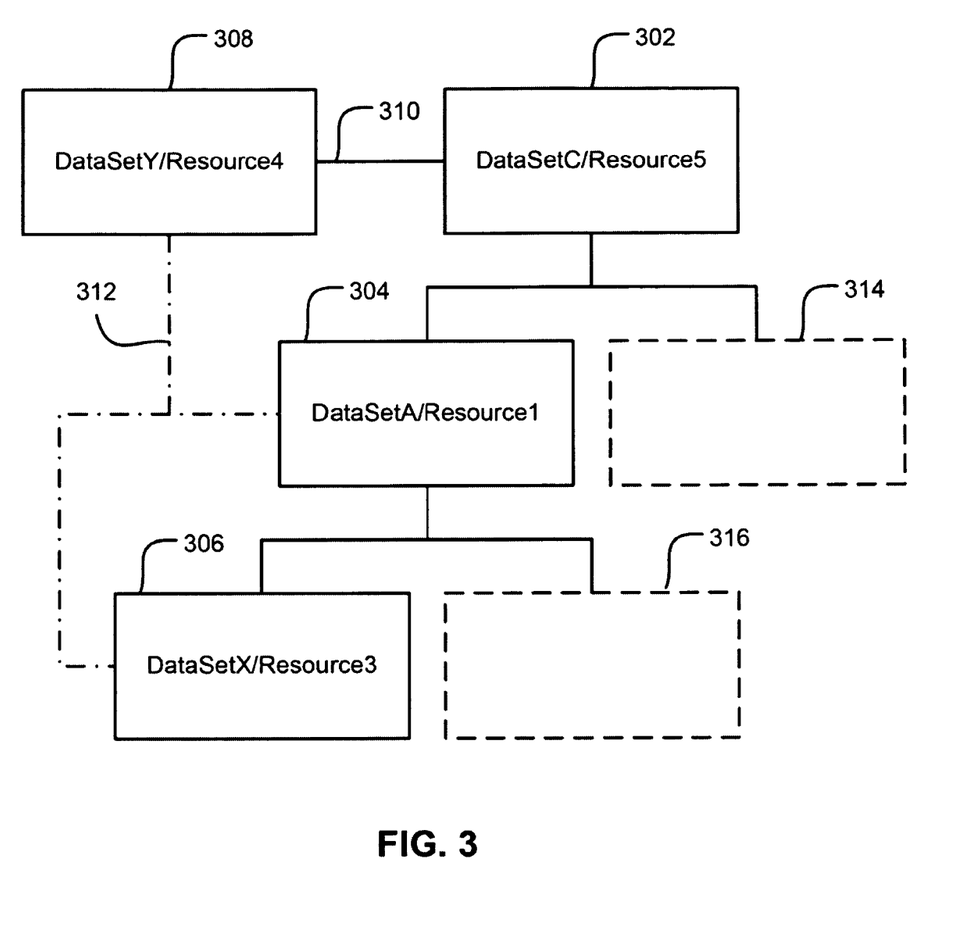
FIG. 3 is a schematic diagram of a hierarchical relationship between distributed sets of data according to one embodiment.

Referring now to FIG. 3, in one embodiment, DataSetA/Resource 1 304 may be the direct subordinate of DataSetC/Resource5 302, and DataSetX/Resource3 306 may be the direct subordinate of DataSetA/Resource1 304. Additional subordinate nodes may also be present at various levels, as indicated by exemplary nodes 314, 316 in dashed lines. In this embodiment, DataSetC/Resource5 302 may be one of several root nodes of an overall hierarchy and the application should know, for each of the lower-level resources it contains, to which branch of the hierarchy the lower-level resource belongs. For example, another resource, DataSetY/Resource4 308, may have the explicit relationship, "relationshipA" 310, with DataSetC/Resource5 302, and the scope of the relationship implicitly extends to all subordinates of DataSetC/Resource5 302 in the form of "relationshipB" 312, but this information is not provided in the raw data stored on the nodes.

In one embodiment, in order to handle these specific requirements, the application might include the following steps in the initialization, with all inter-node exchanges of information tracked (characteristic 3):
1. The virtual application assigns descendant and containment properties to resources.
   a. Each node identifies the branch roots contained in its data sets.
   b. Each subordinate resource (DataSetA/Resource1, DataSetX/Resource3, . . . ) is retrieved by the home node of the root of its branch (DataSetC/Resource5)—characteristic 1.
   c. The branch roots are assigned a "hasDescendants" property which contains a set of references to all of its descendants. Because this property is assigned to the branch root, it will be stored on the branch root's home node—characteristic 2 (local) and characteristic 3 (the property and value should be tagged as having come from the descendant's home node).
   d. The descendants are each assigned an "isInBranch" property which contains a reference to the root branch. Because this property is assigned to the descendants, it will be stored on their home nodes; these home nodes can be remote, thus the data will need to be pushed to them—characteristic 2 (pushed data) and characteristic 3.
2. The virtual application gathers all "relationshipA" properties.
   a. The master node queries all nodes for "relationshipA" properties (DataSetY/Resource4.getRelationshipA()={DataSetC/Resource5, . . . })—characteristic 1.
   b. Each node gathers the data and responds.
3. The virtual application explicitly assigns "relationshipB" properties to all descendants of root branch nodes.
   a. Each node gathers the "isInBranch" properties in its data set (DataSetA/Resource1.isInBranch()=DataSetC/Resource5, DataSetX/Resource3.isInBranch()=DataSetC/Resource5, . . . )
   b. The nodes query the master node for any "relationshipA" properties associated with the "isInBranch" property values they find (?.getRelationshipA()=DataSetC/Resource5, . . . )—characteristic 1.
   c. The nodes add the "relationshipB" properties to the resources found in step b with the values discovered in step (DataSetY/Resource4.setRelationshipB({DataSetA/Resource1, DataSetX/Resource3 . . . }))—characteristic 2 (local).
4. The virtual application serializes all initialization-time calculations needed after initialization—characteristic 4.
   a. Each node serializes the calculations involving data local to it and data involving other nodes, tracking which nodes the data came from.

In this embodiment, steps 1, 2 and 3, according to one embodiment, must be performed in sequence (characteristic 5), and if nodes are operating independently during an initialization step, the master node must wait for all nodes to complete the step before initiating the next step in the sequence. During subsequent initializations according to one embodiment, any of the following might occur:
  All data in all nodes is found to have not changed, so the serialized data from step 4 above is simply reloaded.

Some data in some nodes is found to have changed; the relevant calculations serialized on other nodes are discarded, recalculated and reserialized, while all necessary calculations are performed on the node with the changed data. This incremental type of update is enabled by characteristic 3 above.

Some data in some nodes is found to have changed; the application reloads the serialized data from step 4 above and becomes available for use, deferring the recalculations dealing with changed data to run time.

According to one embodiment, the application may service data requests using three types of queries:

1. Targeted queries—these queries target a specific node and are used when a specific resource, whose home node can be determined, is being requested.
2. Broadcast queries—these queries target all nodes because resources satisfying the query conditions may reside in any node.
3. Multicast queries—these queries target a set of nodes that is defined by excluding nodes that are known to not contain any resources that satisfy given query conditions.

With broadcast and multicast queries, data received from multiple nodes may be aggregated and possibly sorted. If the application has been reinitialized and changes in data in any node were detected but not addressed at initialization time, they might be addressed at run time as a background task, so that the application may be available for use in the meantime.

Figure 4:
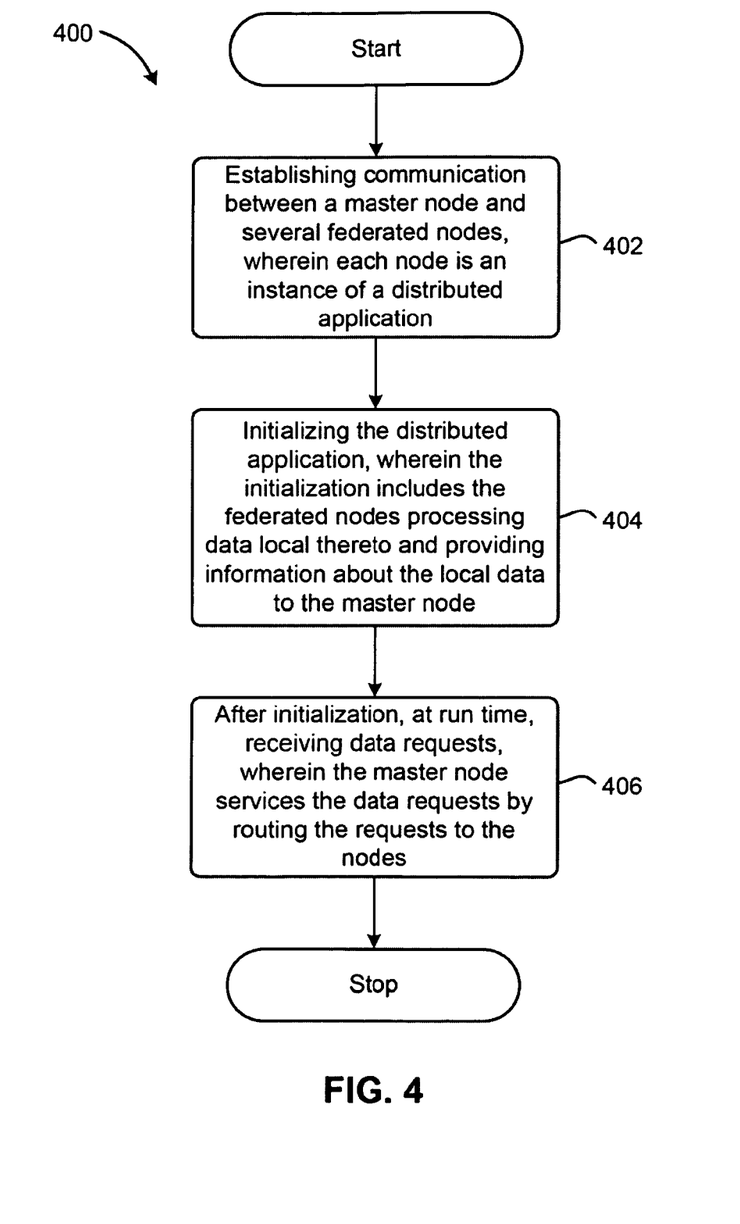
FIG. 4 is a flow diagram of a method according to one embodiment.

FIG. 4 illustrates a flow chart of a method 400 according to one embodiment. As an option, the present method 400 may be implemented in the context and functionality of FIGS. 1-3. Of course, the method 400 may be carried out in any desired environment. It should be noted that the aforementioned definitions may apply during the present description.

With continued reference to FIG. 4, in operation 402, communication may be established between a master node and several federated nodes, wherein each node is an instance of a distributed application.

In operation 404, the distributed application may be initialized, wherein the initialization includes the federated nodes processing data local thereto and providing information about the local data to the master node.

In operation 406, after initialization and at run time, data requests may be received, wherein the master node services the data requests by routing the requests to the nodes.

In one embodiment, at least some of the federated nodes may be running on a machine or machines other than the machine running the master node.

In another embodiment, the master node may orchestrate the initializing from operations 404 and 406.

In yet another embodiment, the initializing may be performed in phases, wherein each phase of the initialization may need to be completed by all of the federated nodes before a subsequent initialization phase is performed.

In a particularly preferred embodiment, the initializing may further comprise sharing information about the local data among the federated nodes, each federated node calculating associations of the data local thereto and local data on another federated node. In addition, the calculating may include generating a hierarchy of local data found in multiple federated nodes, and may further comprise storing references to the federated nodes associated with the local data.

In a further embodiment, method 400 may further comprise identifying branch roots contained in a set of the local data, retrieving subordinate resources to a home node of the root of its branch, assigning to each branch node a set of references to all descendants of the branch root. In addition, method 400 may further comprise assigning to each of the descendants a reference to its root branch.

In another further embodiment, method 400 may further comprise assigning relationship properties to each of the descendants of the root branches, the relationship properties reflecting relationships of the descendants with each other. Further, on each node, the calculations may be serialized according to a further embodiment involving data local thereto.

In other embodiments, reprocessing and reserializing of data (triggered by changes in the raw data) may be done at either initialization or run time; in the latter case, previously-processed data could be loaded to be used while reprocessing is in progress. Accordingly, during a subsequent initialization, if local data on some federated nodes has changed, the serialized data that has not changed may be reloaded for use. Where it is determined that the serialized data is or may be affected by a change in raw data, that serialized data may be reprocessed and updated at run time, which may include recalculating and reserializing the data.

In one approach, the master node may route the requests to all nodes.

In another approach, the master node may route the requests only to those nodes believed to have the requested data. In addition, the requests may not be sent to nodes known to not contain data that satisfies query conditions for the requests.

Figure 5:
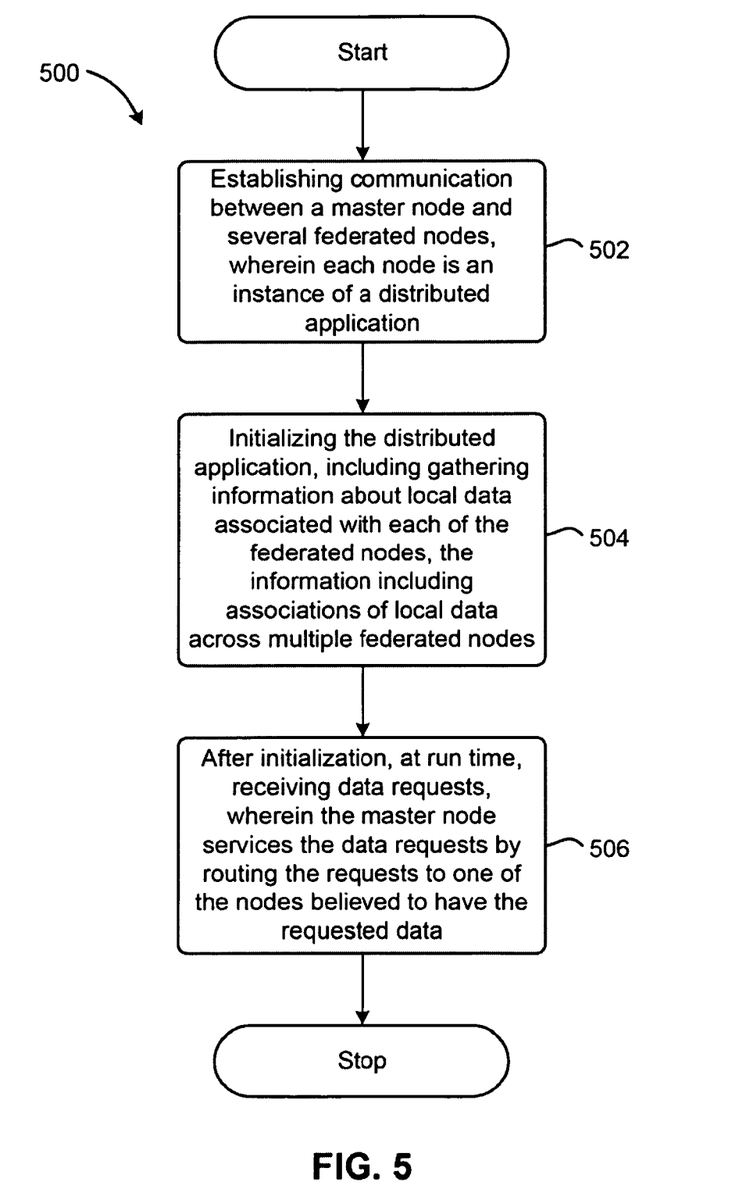
FIG. 5 is a flow diagram of a method according to one embodiment.

FIG. 5 illustrates a flow chart of a method 500 according to one embodiment. As an option, the present method 500 may be implemented in the context and functionality of FIGS. 1-3. Of course, the method 500 may be carried out in any desired environment. It should be noted that the aforementioned definitions may apply during the present description.

With continued reference to FIG. 5, in operation 502, communication is established between a master node and several federated nodes, wherein each node is an instance of a distributed application.

In operation 504, the distributed application may be initialized, including gathering information about local data associated with each of the federated nodes, the information including associations of local data across multiple federated nodes.

In operation 506, after initialization and at run time, data requests may be received, wherein the master node services the data requests by routing the requests to one of the nodes believed to have the requested data.

In a particularly preferred embodiment, the initializing may further comprise sharing information about the local data among the federated nodes, each federated node calculating associations of the data local thereto and local data on another federated node. In addition, the calculating may include generating a hierarchy of local data found in multiple federated nodes, and may further comprise storing references to the federated nodes associated with the local data.

In a further embodiment, method 500 may further comprise identifying branch roots contained in a set of local data, retrieving subordinate resources to a home node of the root of its branch, assigning to each branch a node set of references to all descendants of the branch root.

In another further embodiment, method 500 may further comprise assigning to each of the descendants a reference to its root branch. In addition, method 500 may further comprise assigning relationship properties to each of the descendants of the root branches, the relationship properties reflecting relationships of the descendants with each other.

It will also be clear to one skilled in the art that the method of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried oil any suitable data carrier (also not shown) such as a magnetic or optical computer disc. The channels for the transmission of data likewise may include storage media of all descriptions as well as signal. carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
 establishing communication between a master node and several federated nodes, wherein each node is an instance of a distributed application;
 initializing the distributed application, wherein the initialization includes the federated nodes processing data local thereto and providing information about the local data to the master node; and
 after initialization, at run time, receiving data requests, wherein the master node services the data requests by routing the requests to the nodes.

2. The method of claim 1, wherein at least some of the federated nodes are running on a machine or machines other than a machine running the master node.

3. The method of claim 1, wherein the master node orchestrates the initializing.

4. The method of claim 1, wherein the initializing is performed in phases, wherein each phase of the initialization is completed by all of the federated nodes before a subsequent initialization phase is performed.

5. The method of claim 1, wherein the initializing further comprises sharing information about the local data among the federated nodes, each federated node calculating associations of the data local thereto and local data on another federated node.

6. The method of claim 5, wherein the calculating includes generating a hierarchy of local data found in multiple federated nodes, and further comprising storing references to the federated nodes associated with the local data.

7. The method of claim 6, further comprising identifying branch roots contained in a set of the local data, retrieving subordinate resources to a home node of the root of its branch, assigning to each branch node a set of references to all descendants of the branch root, wherein at least some of the descendants are located on remote nodes.

8. The method of claim 7, further comprising assigning to each of the descendants a reference to its root branch and sending the reference to home nodes of the descendants for storage thereon.

9. The method of claim 8, further comprising assigning relationship properties to each of the descendants of the root branches, the relationship properties reflecting relationships of the descendants with each other.

10. The method of claim 9, further comprising, on each node, serializing the calculations involving data local thereto.

11. The method of claim 10, wherein during a subsequent initialization, if some local data on some federated nodes has changed, reloading the serialized data for use and updating the serialized data at run time.

12. The method of claim 10, wherein during a subsequent initialization, if some local data on one of the federated nodes has changed, discarding the serialized data, processing the data on the one of the federated nodes, reperforming the calculating, and reperforming the serializing.

13. The method of claim 1, wherein the master node routes the requests to all nodes.

14. The method of claim 1, wherein the master node routes the requests only to those nodes believed to have the requested data.

15. The method of claim 14, wherein the requests are not sent to nodes known to not contain data that satisfies query conditions for the requests.

16. A method, comprising:
   establishing communication between a master node and several federated nodes, wherein each node is an instance of a distributed application;
   initializing the distributed application, including gathering information about local data associated with each of the federated nodes, the information including associations of local data across multiple federated nodes; and
   after initialization, at run time, receiving data requests, wherein the master node services the data requests by routing the requests to one of the nodes believed to have the requested data.

17. The method of claim 16, wherein the initializing further comprises sharing information about the local data among the federated nodes, each federated node calculating associations of the data local thereto and local data on another federated node, wherein the calculating includes generating a hierarchy of local data found in multiple federated nodes, and further comprising storing references to the federated nodes associated with the local data.

18. The method of claim 17, further comprising identifying branch roots contained in a set of the local data, retrieving subordinate resources to a home node of the root of its branch, assigning to each branch node a set of references to all descendants of the branch root, wherein at least some of the descendants are located on remote nodes.

19. The method of claim 18, further comprising assigning to each of the descendants a reference to its root branch and sending the reference to home nodes of the descendants for storage thereon.

20. The method of claim 19, further comprising assigning relationship properties to each of the descendants of the root branches, the relationship properties reflecting relationships of the descendants with each other.

* * * * *